Dec. 1, 1959  C. E. BRANSCOMB  2,915,161
CLUTCH MECHANISM
Filed June 6, 1956  4 Sheets-Sheet 1
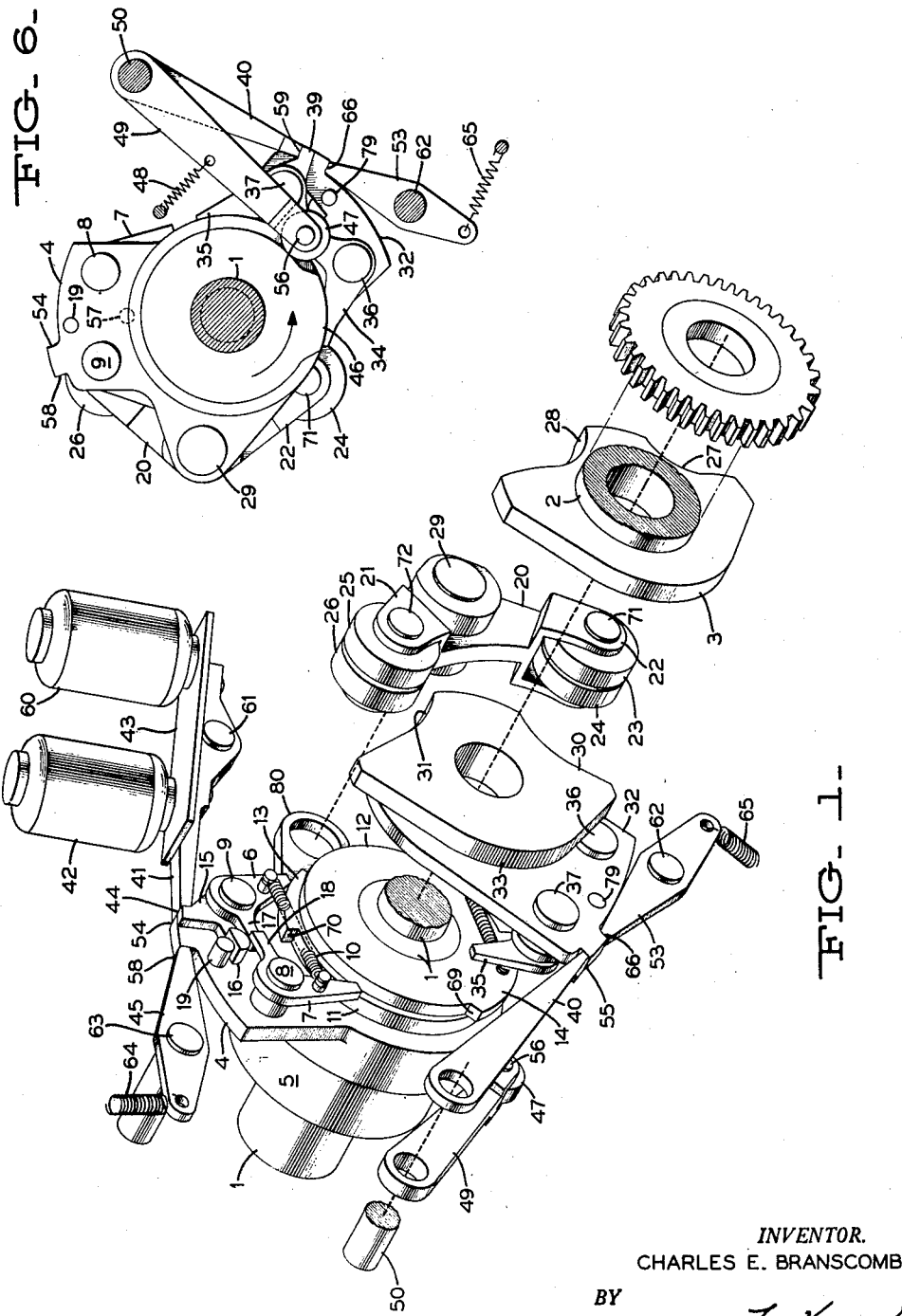
INVENTOR.
CHARLES E. BRANSCOMB
BY
Donald F. Voss
ATTORNEY

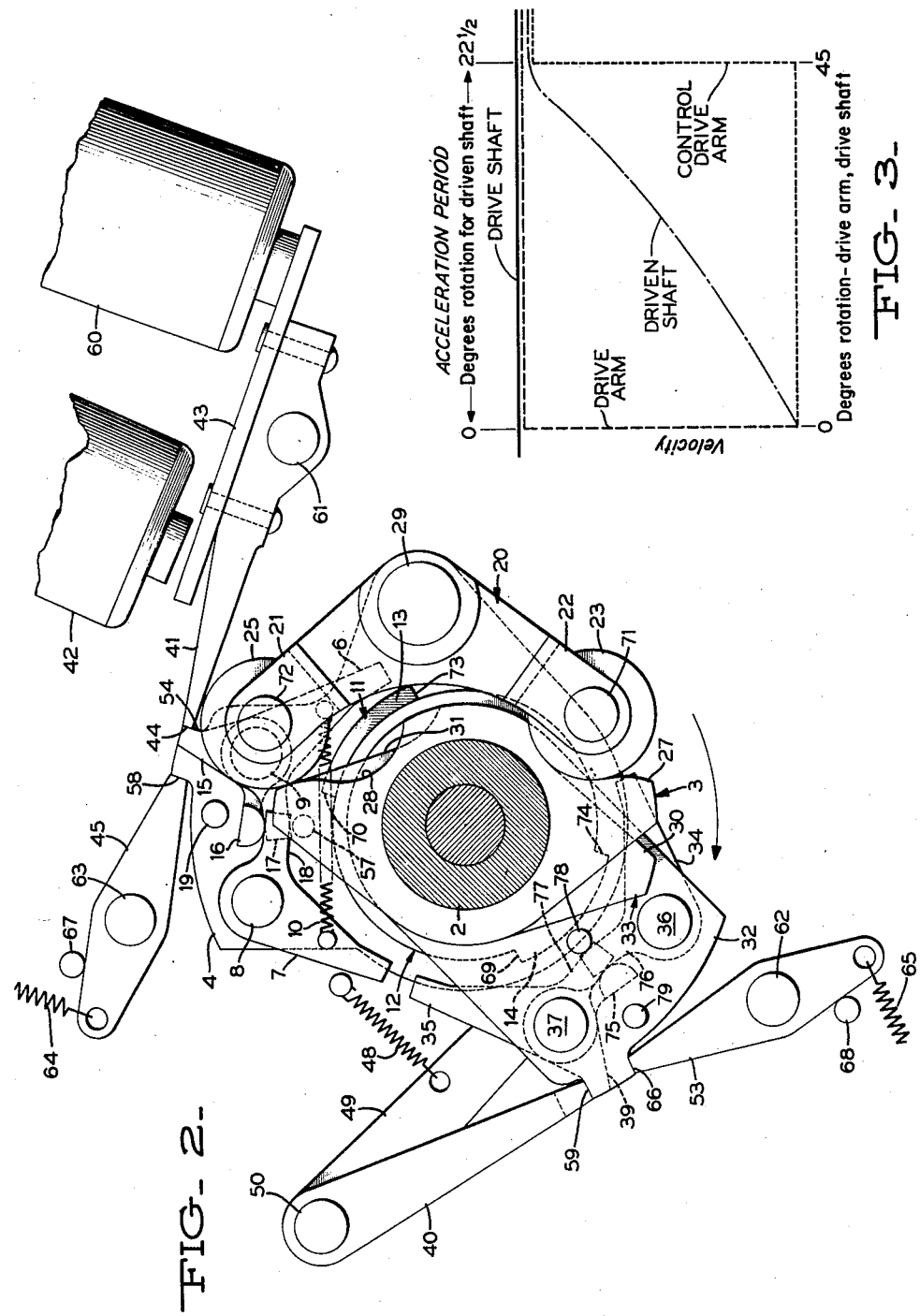

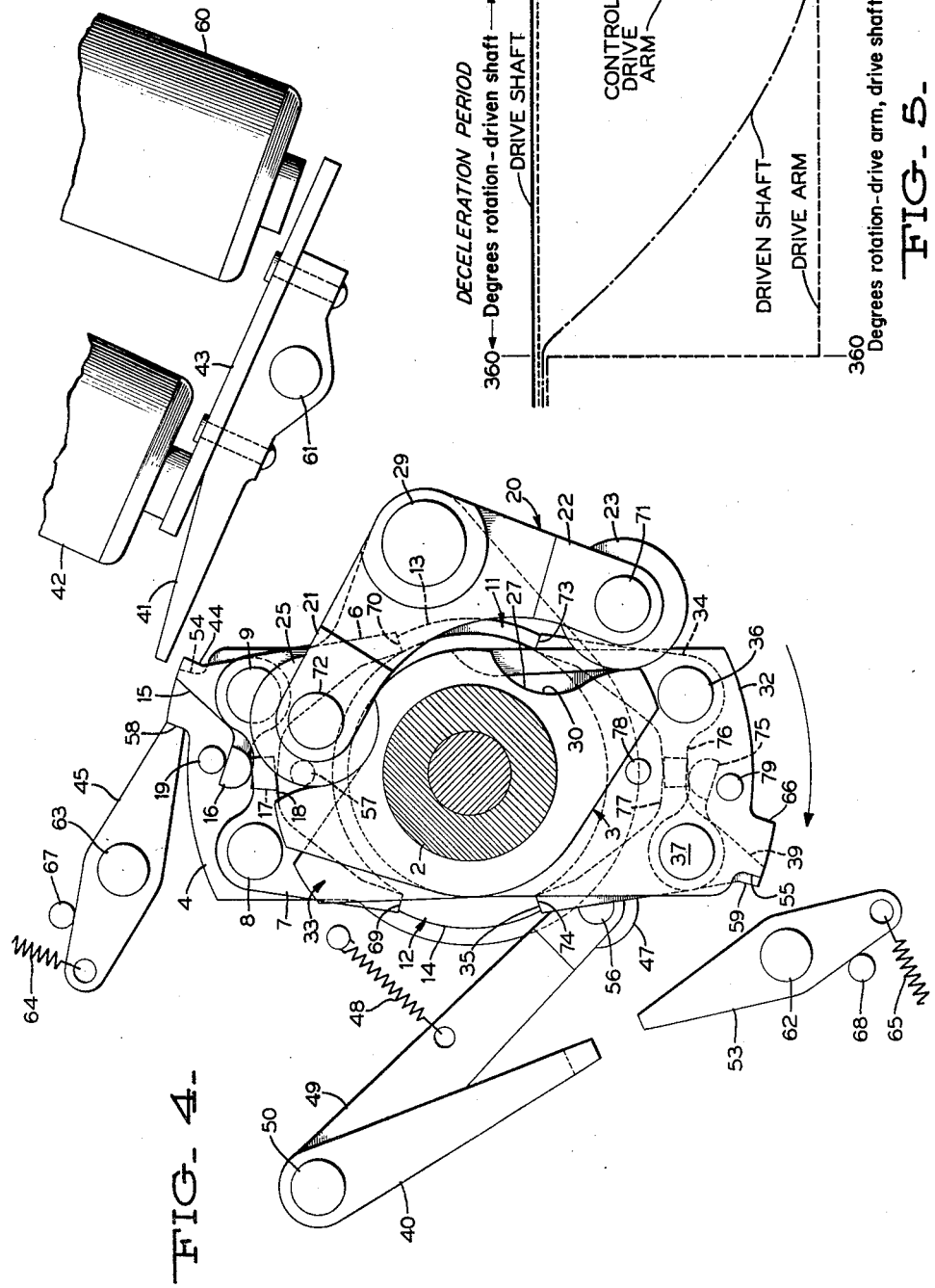

Dec. 1, 1959   C. E. BRANSCOMB   2,915,161
CLUTCH MECHANISM
Filed June 6, 1956   4 Sheets-Sheet 4

United States Patent Office 2,915,161
Patented Dec. 1, 1959

2,915,161

CLUTCH MECHANISM

Charles E. Branscomb, Johnson City, N.Y., assignor to International Business Machines Corporation, New York, N.Y., a corporation of New York Application June 6, 1956, Serial No. 589,763

13 Claims. (Cl. 192—149)

This invention relates to a clutch mechanism and more particularly to a controlled acceleration and deceleration clutch mechanism.

In the operation of accounting and other similar types of machines, it is frequently necessary that certain parts which are at rest be connected to the driving mechanism for one or more complete cycles and then be disconnected therefrom and returned to the rest position in a determined manner.

This type of operation is adapted to the use of a positive type clutch mechanism. However, since the operation of the mechanism may well be at high speeds, impact and inertia forces in positive clutching can become quite considerable and any sustained intermittent operation would cause considerable damage or abnormal wear to the mechanism unless detrimental effects of these forces were obviated.

The operation of a machine utilizing a positive clutch mechanism can be so timed that it is not necessary during a certain portion of each cycle to maintain any driving part in absolute synchronism with the driven part. Accordingly, by starting and stopping the driven member slowly in a controlled manner, the damaging effects of the inertia and impact forces are obviated. Furthermore, since the clutch mechanism is controlled positively during the clutching and declutching operation, it is unnecessary to have any type of homing device to return the mechanism to its initial position as required in the type of clutch mechanism which does not positively control the acceleration and deceleration of the driven member.

Another factor to consider in positive clutching at high speeds is the noise created by the mechanism. The noise element can become quite annoying and fatiguing to the machine operator as well as interfering with a business office routine.

By positively accelerating and decelerating the driven member and limiting the members coming into impact contact to a relatively small mass in comparison with the load to be driven, the amount of noise created by the clutch mechanism is greatly reduced.

An object of the invention is to provide an improved acceleration control for a positive clutch which connects a driven member to a driving member.

Another object of the invention is to provide an improved deceleration control for a positive clutch which disconnects a driven member from a driving member.

A further object of the invention is to positively clutch a driving member to an intermediate member of less mass than the mass of a driven member and load connected to the driving member through the intermediate member.

A still further object of the invention is to translate the motion of an intermediate member positively clutched to a driving member to an accelerating type of motion by means of a control member and transmit the translated motion through the intermediate member to a driven member and load.

Still another object of the invention is to clutch a driving member to a control member of less mass than the mass of a driven member connected to the driving member through an intermediate member.

An additional object of the invention is to controllably accelerate a driven member of a positive clutch from a rest position up to the speed of a driving member of the clutch over a predetermined period of a clutching cycle.

Another additional object of the invention is to controllably decelerate a driven member of a positive clutch from the speed of a driving member of the clutch to a rest position over a predetermined period of a declutching cycle.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is an exploded perspective view of the clutch mechanism.

Fig. 2 is a right end elevation showing the clutch elements held out of engagement.

Fig. 3 is a diagram showing the velocities of the several clutch elements with respect to degrees of rotation during the period of acceleration.

Fig. 4 is a right end elevation showing the clutch elements engaged.

Fig. 5 is a diagram showing the velocities of the several clutch elements with respect to degrees of rotation during the period of deceleration.

Fig. 6 is a left end elevation showing the clutch elements out of engagement.

Figure 7:
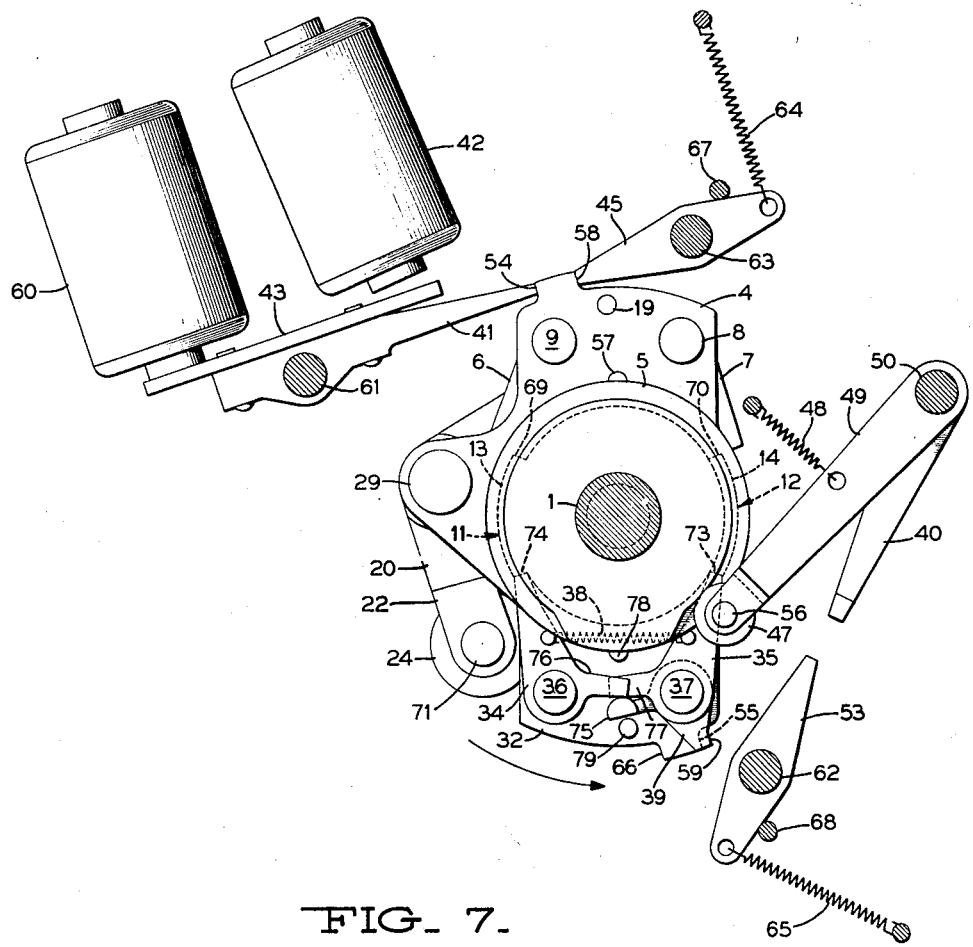
Fig. 7 is a left end elevation showing the relative position of the clutch elements at the beginning of the period of deceleration.

The clutch has been illustrated by way of example as a connecting or clutching mechanism between a driving shaft 1 and a driven shaft 2. The driving shaft rotates constantly while the driven shaft is normally stationary but may be clutched to rotate with and at the speed of the driving shaft at a predetermined time by means of a clutching mechanism hereinafter to be described. The driven shaft will continue to rotate with the driving shaft until a clutch latching mechanism is actuated. Upon actuation of the clutch latching mechanism, the driven shaft is brought to rest in a positive manner over a predetermined period and therefore always coming to rest in the same position.

Referring to Fig. 1, the clutch mechanism consists of a drive arm plate 4 having an integral hub portion 5 rotatably mounted on the driving shaft by means of a bearing, not shown. A dog 7 and detent 6 pivotally mounted on stud pins 8 and 9 secured to the drive arm plate 4 are constantly urged by a spring 10 to engage a pair of discs 11 and 12 provided with projections 13 and 14 extending transversely to the driving shaft and rigidly attached side by side, with the projections disposed 180° from each other, to said driving shaft. When free to do so, the dog 7 will engage the shoulder 69 of the projection 14 and the detent 6 will engage the shoulder 70 of the projection 13. However, a lever 15 rotatably mounted on the stud pin 9 is adapted to hold the dog 7 and detent 6 out of engagement with the discs 11 and 12. The lever 15 is provided with a projecting ear 16 which bears upon the tail 17 of the detent 6 and the tail 18 of the dog 7 and when the lever 15 is caused to rotate counterclockwise, the ear 16 causes the dog 7 to pivot clockwise and the detent 6 to pivot counterclockwise and out of engagement with the discs 11 and 12. In order to prevent overstressing spring 10 (see Fig. 2), a pin 57 secured to the drive arm 4 limits the outward movement of the dog 7 and detent 6 as they are caused to pivot by the lever 15. A pin 19 also secured to the drive arm 4 limits the movement of the lever 15 as the dog and detent position to engage the discs 11 and 12.

A rocker arm 20 carrying at its extreme ends 21 and 22 a set of rollers disposed to act as cam followers is pivotally mounted at a point intermediate its ends on a pin 29 attached to an arm 80 of the drive arm 4. A roller 23 rotatably mounted on a pin 71 fixed to the rocker arm 20 and a roller 25 rotatably mounted on a pin 72 fixed to the rocker arm 20 are disposed to be in constant engagement with a cam surface 27 and a cam surface 28, respectively, on a cam plate 3 integral with the driven shaft 2 which is rotatably mounted on the driving shaft 1 by means of a suitable bearing, not shown.

A roller 24 also rotatably mounted on the pin 71 and a roller 26 also rotatably mounted on the pin 72 are adapted to engage a cam surface 30 and a cam surface 31, respectively, on a cam plate 33 integral with a control drive arm 32 which is rotatably mounted on the driving shaft 1 by means of a suitable bearing. The control drive arm 32 mounted on the driving shaft 1, intermediate of the disc 12 and the driven shaft 2, carries a dog 34 and detent 35 on stud pins 36 and 37 in a manner similar to that of the drive arm 4 which carries dog 7 and detent 6 on pins 8 and 9. A spring 38 (Fig. 7) constantly urges the dog 34 and detent 35 to engage the discs 11 and 12 and when free to do so, the dog 34 will engage the shoulder 73 of the projection 13 and the detent 35 will engage the shoulder 74 of the projection 14. However, a lever 39 rotatably mounted on the pin 37 is adapted to hold the dog 34 and detent 35 out of engagement with the discs 11 and 12. The lever 39 is provided with a projecting ear 75 which bears upon the tail 76 of the dog 34 and the tail 77 of the detent 35 and when the lever is caused to rotate clockwise, the ear 75 causes the dog 34 to pivot counterclockwise and the detent 35 to pivot clockwise and out of engagement with the discs 11 and 12. In order to prevent overstressing spring 38 (see Fig. 7), a pin 78 secured to the control drive arm 32 limits the outward movement of the dog 34 and detent 35 as they are caused to pivot by the lever 39. A pin 79 also secured to the control drive arm 32 limits the movement of the lever 39 as the dog and detent position to engage the discs 11 and 12.

The clutch mechanism is held inoperative by energizing a magnet 60, Figs. 1 and 7, thereby attracting armature 43 pivotally mounted on a pin 61 and carrying a latch 41 which will then position against the shoulder 44 of the lever 15 and against the shoulder 54 of the drive arm 4 to maintain lever 15 in a position to hold the detent 6 and dog 7 out of engagement with the discs 11 and 12. A keeper 45 pivotally mounted on a pin 63 is constantly urged to pivot clockwise by a spring 64 to position against the shoulder 58 of the drive arm 4 to restrain the drive arm from moving away from latch 41. A pin 67 serves to properly position the keeper 45 against the shoulder 58 of the drive arm 4. Similarly, by action of a spring 48, a latch 40 pivotally mounted on a pin 50 maintains lever 39 in a position to hold the dog 34 and detent 35 out of engagement with the discs 11 and 12. A keeper 53 pivotally mounted on a pin 62 and constantly urged to pivot clockwise by a spring 65 positions against the shoulder 66 of the control drive arm 32. A pin 68 serves to properly position the keeper 53 against the shoulder 66 of the control arm 32. Accordingly, the driving member 1 rotates free of the clutch mechanism and driven shaft 2.

In operation of the clutch mechanism a magnet 42 is energized, thereby attracting the armature 43 and releasing the latch 41 from the drive arm 4 and lever 15. With the latch 41 released, the lever 15 is free to rotate clockwise about the pin 9. The dog 7 and detent 6 under action of the spring 10 move toward each other to respectively engage the shoulders 69 and 70 of the projections 14 and 13 on the discs 12 and 11. The dog 7 engages first and before a load reversal takes place, the detent 6 engages. As the dog 7 and detent 6 move toward each other, the lever 15 is caused to rotate clockwise until the ear 16 of the said lever engages the pin 19 which serves to position the dog and detent on the shoulders of the projections of the discs and to limit the movement of the said lever. With the dog 7 and detent 6 engaged, the drive arm 4 is positively coupled to the driving shaft 1 to rotate therewith. Since the drive arm 4 is connected to the driven shaft 2 and the control drive arm 32 through the rocker arm assembly, the said drive arm will tend to rotate the said driven shaft and the said control drive arm. However, rotation of the control drive arm 32 is restricted by the latch 40 and keeper 53. Accordingly, the roller 26 will follow the cam surface 31 and the rollers 23 and 25 will follow the complementary cam surfaces 27 and 28 respectively, and since the driven shaft assembly is free to rotate, it will do so but at the rate governed by the cam surface 31, Fig. 1. A cam surface 46 (Fig. 6) on the sleeve 5 of the drive arm 4 is so designed that at a time somewhat prior to the time the driven shaft 2 is brought up to the speed of the driving shaft 1, it lifts a cam follower 47 held against the cam surface by the spring 48. The cam follower 47 is rotatably mounted on a pin 56 fixed to a crank arm 49 supported to pivot about a pin 50. The latch 40 being integral with the crank arm 49 will pivot counterclockwise as the cam follower 47 is lifted and thereby permitting the lever 39 to be rotated counterclockwise about the pin 37. With the lever 39 free to rotate, the spring 38 moves the dog 34 and detent 35 toward each other and into engagement with the discs 11 and 12. The pin 79 which limits the rotation of the lever 39 causes the dog 34 and detent 35 to properly position respectively on the shoulders 73 and 74 of the projections 13 and 14 of the discs 11 and 12. The control drive arm 32 is now positively coupled to rotate with the driving shaft 1. Accordingly, the driving shaft 1, drive arm 4, control drive arm 32 and driven shaft 2 will now rotate together as a unit.

The relative velocities of the driving shaft, the drive arm, the driven shaft and the control drive arm with respect to degrees of rotation during the period of acceleration is shown in Fig. 3.

The driven shaft 2 will continue to be rotated by the driving shaft 1 until the latch 41 is released into the path of the lever 15 and drive arm 4. When the latch 41 is released, it will be in position to engage first the edge 44 of lever 15 and then the shoulder 54 of the drive arm 4. The keeper 45 will position against the shoulder 58 of the drive arm 4 to prevent the said drive arm from backing away from the latch 41. Since the lever 15 is rotating with the drive arm 4, it will be driven into the latch 41; however, the latch 41 is not free to move. Therefore, the lever 15 will be rotated counterclockwise and as it rotates, it will disengage the dog 7 and detent 6 from the shoulders 69 and 70 of the projections 14 and 13 on the discs 12 and 11. The drive arm 4 is now disconnected from the driving shaft 1. As the control drive arm 32 and the driven shaft 2 continue to rotate, the roller 24 will follow the cam surface 30 on the cam plate 33 and rollers 23 and 25 will follow respectively the complementary cam surfaces 27 and 28 on the cam plate 3. The driven shaft 2 will decelerate at a rate governed by the cam surface 30. In Fig. 7 with the drive arm 4 held stationary by the latch 41 and keeper 45, the cam surface 46 on the said drive arm is holding the cam follower 47 at its low point, therefore holding the latch 40 in the path of the control drive arm 32. The latch 40 will first engage an edge 59 of the lever 39 and then shoulder 55 of the control drive arm. The keeper 53 will position against the shoulder 66 of the control drive arm 32 to prevent the said control drive arm from moving away from the latch 40. As the lever 39 is driven into the latch 40, it is caused to rotate clockwise about the pin 37 and in doing so, it will disengage the dog 34 and detent 35 from the shoulders 73 and 74 of the projections 13 and 14 on the discs 11 and 12. Accordingly, the driven shaft 2 is decelerated and brought to rest in a positive manner.

The relative velocities of the driving shaft, the drive arm, the driven shaft and the control drive arm with respect to degrees of rotation during the period of deceleration is shown in Fig. 5.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a controlled acceleration-deceleration clutch mechanism comprising a constantly rotating drive shaft, a rotatable driven shaft coaxial with said drive shaft and provided with a sleeve having a set of complementary cams, a normally stationary first clutch member adapted for rotation about the same axis as the drive shaft and connectable to said drive shaft and the driven shaft, a means to connect the first clutch member to said drive shaft, a connecting means between the first clutch member and the driven shaft, said connecting means disposed to follow the complementary cams carried by said driven shaft to permit variation of the angular relationship of said first clutch member and said driven shaft, a normally stationary second clutch member adapted for rotation about the same axis as the drive shaft and connectable thereto and having a sleeve with an accelerating cam and decelerating cam engaging said connecting means between said first clutch member and driven shaft to modify the drive ratio of said first clutch member to the driven shaft by variation of their angular relationship, and means operable after a given angular movement of said first clutch member, following the connecting of the first clutch member to said drive shaft for connecting the second clutch member to the drive shaft.

2. In a controlled acceleration-deceleration clutch mechanism comprising a constantly rotating drive shaft, a rotatable driven shaft coaxial with said drive shaft and adapted to be accelerated to synchronously rotate therewith, a cam plate provided with complementary cams fixed to said driven shaft, a first clutch member rotatable about the same axis of the said drive shaft, means for connecting said first clutch member to said drive shaft, a second clutch member rotatable about the same axis of the said drive shaft, a cam plate provided with an accelerating cam and decelerating cam fixed to said second clutch member, a plurality of cam followers pivotally attached to said first clutch member and arranged to follow said complementary, accelerating and decelerating cams in a manner to permit variation of the angular relationship of said first clutch member and driven shaft, a means for holding second clutch member stationary during the period said driven shaft is accelerated to synchronously rotate with said drive shaft, and a means for connecting said second clutch member to said drive shaft after the driven shaft has been accelerated to synchronize with said drive shaft so that the drive shaft, the first clutch member, the second clutch member and driven shaft rotate together as a unit.

3. In a controlled acceleration-deceleration clutch mechanism, a constantly rotating primary driving member, a secondary driving member coaxial with and connectable to said primary driving member, a means for connecting the secondary driving member to the primary driving member, a rotatable driven member coaxial with said primary driving member, a means for connecting said driven member to said secondary driving member in a manner to permit variation of the angular relationship of said driven member and secondary driving member, an accelerating means for accelerating said driven member from rest to synchronize with said primary driving member, means for engaging said accelerating means with said secondary driving member and means for connecting said accelerating means to said primary driving member after the period of acceleration so that the primary driving member, the secondary driving member, the driven member and the accelerating means then rotate together as a unit.

4. In a controlled acceleration-deceleration clutch mechanism as in claim 3, including a decelerating means for decelerating the driven member from the speed of the primary driving member to rest, means connecting the decelerating means to the primary driving member, means engaging said accelerating means with the secondary driving member during the period of deceleration, the secondary driving member being connected with the driven member and disconnected from the primary driving member, a means for disconnecting the decelerating means from the primary driving member following the period of deceleration, and a means for holding the decelerating means at rest in a fixed position after the period of deceleration at which time the decelerating means has been disconnected from the primary driving member.

5. In a controlled acceleration-deceleration clutch mechanism, a constantly rotating drive shaft; a rotatable driven shaft coaxial with the drive shaft; a normally stationary drive element positively clutchable to the drive shaft; normally stationary cam means; means for holding said cam means stationary during the accelerating period; a follower arm pivotally supported to said drive element, said follower arm disposed to be acted upon by said cam means to modify the drive ratio of said drive element to the driven shaft by variation of their angular relationship; and means operable after a given angular movement of said drive shaft following the clutching of said drive element to the drive shaft for clutching said cam means to the drive shaft.

6. In a controlled acceleration-deceleration clutch mechanism comprising a constantly rotating drive shaft; a rotatable driven shaft coaxial with the drive shaft; a normally stationary drive element positively clutchable to the drive shaft; means for holding said drive element against rotation during the deceleration period; cam means adapted to be rotated during the deceleration period; a follower arm pivotally supported to said drive element and disposed to be acted upon by said cam means to modify the drive ratio of said drive element to the driven shaft by variation of their angular relationship; and means operable after a given angular movement of said drive shaft, following the declutching of the drive element from the drive shaft, for declutching said cam means from the drive shaft.

7. In a controlled acceleration-deceleration clutch mechanism, a constantly rotating primary driving member; a secondary driving member coaxial with and connectable to said primary driving member; a means for connecting the secondary driving member to the primary driving member; a rotatable driven member coaxial with said primary driving member; a hub integral with said driven member and provided with complementary cams; means cooperating with said complementary cams for connecting said driven member to said secondary driving member in a manner to permit variation of the angular relationship of said driven member and secondary driving member; an accelerating means for accelerating said driven member from rest to synchronize with said primary driving member, said accelerating means adapted to be in engagement with said secondary driving member and to be connected to said primary driving member after the period of acceleration so that the primary driving member, the secondary driving member, the driven member and the accelerating means then rotate together as a unit; means for connecting said accelerating means to said secondary driving member; and a means for connecting said accelerating means to said primary driving member.

8. In a controlled acceleration-deceleration clutch mechanism, a constantly rotating primary driving member; a secondary driving member coaxial with and connectable to said primary driving member; means for connecting said secondary driving member to said primary driving member; a rotatable driven member coaxial with said primary driving member having complementary cam surfaces; means for connecting said driven member to said secondary driving member in a manner to permit variation of the angular relationship of said driven member and said secondary driving member; said connecting means comprising a pin attached to said secondary driving member, a rocker arm pivotally connected intermediate of its ends to said pin, a cam follower carried on each end of said rocker arm so as to be disposed for engagement with the complementary cam surfaces on said driven member, accelerating means for controlling the rotation of said driven member from rest to synchronization with said primary driving member, said accelerating means adapted to be held stationary during the accelerating period and to be connected to said primary driving member after the period of acceleration so that the primary driving member, the secondary driving member, the driven member and the accelerating means then rotate together as a unit; means for connecting said accelerating means to said secondary driving member; and means for connecting said accelerating means to said primary driving member.

9. In a controlled acceleration-deceleration clutch mechanism, a constantly rotating primary driving member; a secondary driving member coaxial with and connectable to said primary driving member; means for connecting said secondary driving member to said primary driving member; a rotatable driven member coaxial with said primary driving member; means for connecting said driven member to said secondary driving member in a manner to permit variation of the angular relationship of said driven member and secondary driving member; acceleration control means for controlling the rotation of said driven member from rest to synchronization with said primary driving member; means to hold said acceleration control means stationary during the acceleration period; means for connecting said acceleration control means to said primary driving member after the period of acceleration so that said primary driving member, said secondary driving member, said driven member and said acceleration control means then rotate together as a unit; means for connecting said acceleration control means to said secondary driving member; means for connecting said acceleration control means to said primary driving member; deceleration means for controlling the rotation of said driven member from the speed of the primary driving member to rest, said deceleration control means being connected to said primary driving member and engaged with the secondary driving member during the period of deceleration, said secondary driving member being connected with said driven member and disconnected from said primary driving member during the period of deceleration; means for disconnecting said deceleration control means from said primary driving member following the period of deceleration; and means for holding said deceleration control means at rest in a fixed position after the period of deceleration, at which time the deceleration control means has been disconnected from said primary driving member; and a member coaxial with said primary driving member for carrying said accelerating and decelerating means.

10. A controlled acceleration-deceleration clutch mechanism as described in claim 9 wherein said acceleration control means comprises an accelerating cam integral with said member carrying the acceleration and deceleration control means and disposed for engagement with the means for connecting said acceleration control means to said secondary driving member.

11. A clutch mechanism as described in claim 10 wherein said deceleration control means comprises an acceleration cam integral with said member carrying the acceleration and deceleration control means and disposed for engagement with the means for connecting said deceleration control means to the secondary driving member.

12. A clutch mechanism as described in claim 11 wherein said means for connecting said acceleration control means to said secondary driving member comprises a pin attached to said secondary driving member, a rocker arm pivotally connected on one end to said pin, a roller rotatably attached to the other end of said rocker arm and disposed for engagement with the acceleration cam with said acceleration control means.

13. A clutch mechanism as described in claim 12 wherein said means for connecting said acceleration control means to said secondary driving member comprises a pin attached to said secondary driving member, a rocker arm pivotally connected on one end to said pin, a roller rotatably attached to the other end of said rocker arm and disposed for engagement with the decelerating cam of said decelerating means.

References Cited in the file of this patent

UNITED STATES PATENTS

| | | |
|---|---|---|
| 2,633,957 | Gardinor et al. | Apr. 7, 1953 |
| 2,699,072 | Wrinkle | Jan. 11, 1955 |
| 2,744,600 | Kohler et al. | May 8, 1956 |
| 2,777,552 | Flavin | Jan. 15, 1957 |